T. C. DAVENPORT.
GREASE CUP.
APPLICATION FILED JULY 2, 1920.

1,389,437.

Patented Aug. 30, 1921.

WITNESSES
Bernard Aebly
L. A. Paley

INVENTOR
Thomas C. Davenport.
BY Munn & Co
ATTORNEYS

UNITED STATES PATENT OFFICE.

THOMAS C. DAVENPORT, OF NEW HAVEN, CONNECTICUT.

GREASE-CUP.

1,389,437.

Specification of Letters Patent.    Patented Aug. 30, 1921.

Application filed July 2, 1920. Serial No. 393,617.

*To all whom it may concern:*

Be it known that I, THOMAS C. DAVENPORT, a citizen of the United States, and a resident of New Haven, in the county of New Haven and State of Connecticut, have invented a new and Improved Grease-Cup, of which the following is a full, clear, and exact description.

This invention relates to grease cups and has reference more particularly to grease cups especially adapted for use on locomotive side rods.

An object of this invention is to provide a grease cup for locomotive side rods which will not become lost due to the vibration or motion of the side rod.

Reference is to be had to the accompanying drawing forming a part of this specification, in which it is understood that the drawing illustrates only one form of the invention and in which—

Figure 1:
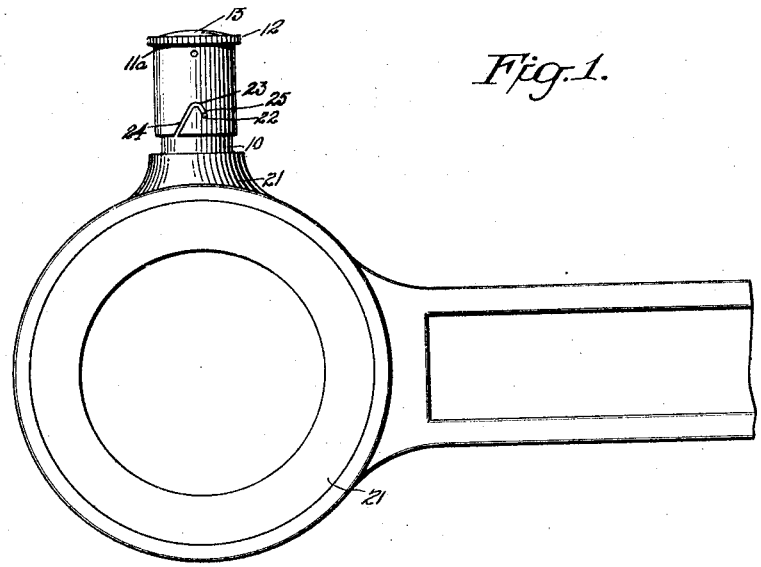
Figure 1 is a side elevation of the grease cup applied to a locomotive side rod.

Referring to the accompanying drawing by numerals, 10 indicates a grease chamber, preferably formed integral with the locomotive side rod, said chamber being cylindrical in shape. A cup having a cylindrical wall 11 with an internal diameter equal substantially to the external diameter of the grease chamber 10 is adapted to fit over said chamber and said cup is provided at one end with an offset annular shoulder 12 pressed into the cup 11. A cover 13 is formed on the cup, said cover providing a seat for a coil spring 14, one end of which fits into a groove 15 formed by the annular shoulder 12. The other end of the spring 14 is secured to a button 16 fixed to a disk 17 by means of a shank 18. The disk 17 has an outside diameter approximately equal to the inside diameter of the cup 11 and is formed with a reduced portion 19 having an outside diameter approximately equal to the inside diameter of the chamber 10. An oil hole 20 is formed in the side rod 21, said hole leading to the bearing and serving to conduct heavy grease from the chamber 10 to said bearing.

In order to maintain the cup 11 in position on the grease chamber 10 so that said cup will not be thrown off or lost due to the motion of the side rod, I provide a pair of diametrically opposite pins 22 secured in the wall of the grease chamber 10, said pins projecting from the outside surface of said wall. A pair of V-shaped notches 23 are formed in the wall of the cup 11, said notches being diametrically opposite and oppositely turned. These V-shaped notches 23 consist of long legs 24 extending completely to the end of the cup 11 and short legs 25 which extend only part way to the end of said cup. Each of the notches 23 is adapted to engage a pin 22 so that the cup 11 can be locked in position on the chamber 10 by a partial rotation of said cup so that the pins will finally rest in the end of the short legs 25, as shown in Fig. 1, thus locking the cup 11 in position on the chamber 10. The pin 22 will be held in this locked position due to the pressure of the spring 14 which tends to separate the cup 11 from the said chamber 10. A vent hole $11^a$ is provided in the wall of the cup 11 adjacent the shoulder 12 so that air may escape from the said cup when the same is placed in position on the chamber 10.

Figure 2:
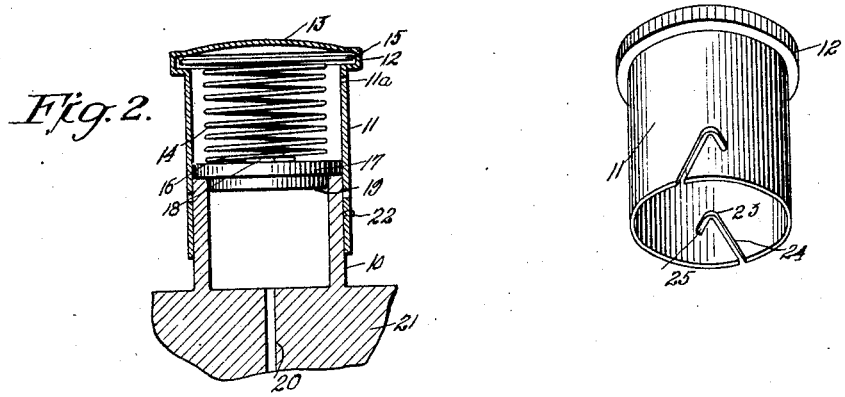
Fig. 2 is a central sectional view through the grease cup.
Figure 3:
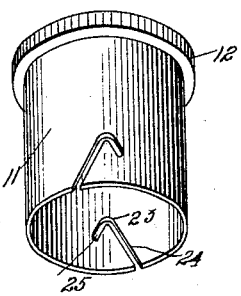
Fig. 3 is a perspective view of the grease cup.
Figure 4:
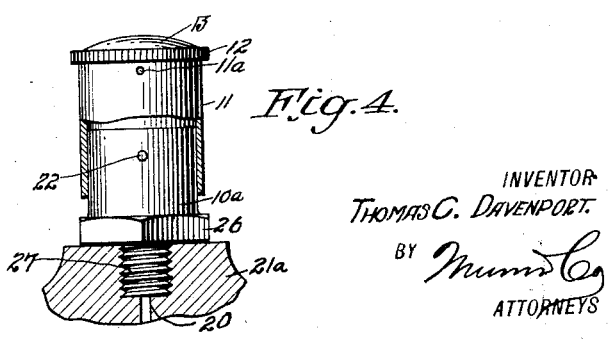
Fig. 4 is a fragmentary side elevation of a modified form of grease cup with parts broken away to disclose the construction.

In the modification shown in Fig. 4, the grease chamber $10^a$ is separable from the body $21^a$ which is to be oiled. A nut 26 is formed on the lower end of said chamber $10^a$ and a threaded section 27 is formed on the bottom of said chamber $10^a$ which is adapted to screw into a tapped hole in the body $21^a$. A grease hole 20 is formed in the body $21^a$ which is adapted to register with a similar hole extending through the section 27 and the bottom of the chamber $10^a$. The rest of the grease cup in this modification is similar to the grease cup shown in Fig. 2 but this modification is suitable for a variety of other processes than the side rod of a locomotive.

In operation, the cup 11 is removed, and the grease chamber 10 is filled level with the top with a heavy grease. The cup 11 is then inserted on the chamber 10 by causing the V-shaped notches 23 to engage the pins 22. The disk 19 will then be forced into the chamber 10 under the action of the spring 14 so that the heavy grease will be forced through the hole 20 into the bearing. After the engine is running for some time, the grease will warm and will flow through the opening 20 without any further assistance from the disk 19.

I would state in conclusion that while the illustrated example constitutes a practical embodiment of my invention, I do not limit myself precisely to the details herein described, since, manifestly, the same can be considerably varied without departing from the spirit of the invention as defined in the appended claim.

Having thus described my invention, I claim as new and desire to secure by Letters Patent:

A device of the character described comprising in combination with a connecting rod, a grease receptacle formed integral with the connecting rod and communicating with a bearing through a passage formed in the connecting rod, a cover for said grease receptacle, said cover comprising a sheet metal member formed with an integral head of larger diameter than the diameter of the cover, a closing plate adapted to be placed within the cover and formed with a reduced portion adapted to be received within the open end of the grease receptacle, a coil spring secured at one end to said closing plate and having its other end lying within the groove formed by the enlarged head portion of the cover, said spring being maintained under pressure to retain the reduced portion of the closure plate within the open upper end of the grease receptacle, and means for securing said cover in position upon the grease receptacle.

THOMAS C. DAVENPORT.